US010860941B2

(12) United States Patent
Yang et al.

(10) Patent No.: US 10,860,941 B2
(45) Date of Patent: Dec. 8, 2020

(54) METHOD AND DEVICE FOR PREDICTING INFORMATION PROPAGATION IN SOCIAL NETWORK

(71) Applicant: HUAWEI TECHNOLOGIES CO., LTD., Shenzhen, Guangdong (CN)

(72) Inventors: Yang Yang, Beijing (CN); Wing Ki Leung, Shenzhen (CN); Jie Tang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 938 days.

(21) Appl. No.: 15/460,247

(22) Filed: Mar. 16, 2017

(65) Prior Publication Data

US 2017/0185908 A1 Jun. 29, 2017

Related U.S. Application Data

(63) Continuation of application No. PCT/CN2015/079877, filed on May 27, 2015.

(30) Foreign Application Priority Data

Sep. 18, 2014 (CN) .......................... 2014 1 0478217
Mar. 24, 2015 (CN) .......................... 2015 1 0131640

(51) Int. Cl.
*G06Q 30/02* (2012.01)
*G06Q 30/00* (2012.01)
(Continued)

(52) U.S. Cl.
CPC ............. *G06N 7/005* (2013.01); *G06F 16/00* (2019.01); *G06N 5/022* (2013.01); *G06N 20/00* (2019.01);
(Continued)

(58) Field of Classification Search
CPC ........ G06N 7/005; G06N 20/00; G06N 5/022; G06F 16/00; G06Q 30/0241; G06Q 50/01
(Continued)

(56) References Cited

U.S. PATENT DOCUMENTS 8,473,437 B2 6/2013 Zaman et al.
2011/0320284 A1 * 12/2011 Tennenholtz .......... G06Q 30/02 705/14.69
(Continued)

FOREIGN PATENT DOCUMENTS

CN 102843420 A 12/2012
CN 103258248 A 8/2013
(Continued)

OTHER PUBLICATIONS

Xiaohang Zhang et al:“Identifying influential nodes in complex networks with community structure”, Knowledge-Based Systems,vol. 42, Jan. 26, 2013, pp. 74-84 ,XP055358133.
(Continued)

*Primary Examiner* — Brandon S Cole
(74) *Attorney, Agent, or Firm* — Leydig, Voit & Mayer, Ltd.

(57) ABSTRACT

A method for predicting information propagation in a social network includes acquiring target information to be predicted, and acquiring influences of K clusters, where the target information is posted or forwarded by a first user at a first moment, and K is a positive integer; determining a role probability distribution of the first user, and determining a second user who has not propagated the target information, where the role probability distribution of the first user is used to indicate probabilities that the first user belongs separately to the K clusters; and determining, according to the influences of the K clusters and the role probability distribution of the first user, a probability that the second user forwards
(Continued)

the target information from the first user. In the embodiments of the present application, propagation of target information in a social network can be predicted by using influences of K clusters.

18 Claims, 3 Drawing Sheets

(51) Int. Cl.

| | |
|---|---|
| ***G06N 5/02*** | (2006.01) |
| ***G06F 15/16*** | (2006.01) |
| ***G06Q 50/00*** | (2012.01) |
| ***G06N 7/00*** | (2006.01) |
| ***G06N 20/00*** | (2019.01) |
| ***G06F 16/00*** | (2019.01) |

(52) U.S. Cl.
CPC ......... *G06Q 30/0241* (2013.01); *G06Q 50/01* (2013.01)

(58) Field of Classification Search
USPC ........................................................ 706/1–61
See application file for complete search history.

(56) References Cited

U.S. PATENT DOCUMENTS

| | | | |
|---|---|---|---|
| 2012/0158630 A1 | 6/2012 | Zaman et al. | |
| 2013/0151330 A1 | 6/2013 | Evancich et al. | |
| 2015/0081725 A1* | 3/2015 | Ogawa | G06Q 50/01 707/754 |
| 2015/0242689 A1* | 8/2015 | Mau | G06Q 50/01 382/190 |

FOREIGN PATENT DOCUMENTS

| | | |
|---|---|---|
| CN | 103699650 A | 4/2014 |
| CN | 103714130 A | 4/2014 |
| CN | 103793489 A | 5/2014 |

OTHER PUBLICATIONS

J. Goldenberg, et. al, Talk of the Network: A Complex Systems Look at the Underlying Process of Word-of-Mouth. Marketing Letters, Aug. 2001. pp. 211-223.
M. Granovetter, Threshold Models of Collective Behavior. American Journal of Sociology, 1978. total 25 pages.
A. Goyal, et. al, Learning Influence Probabilities in Social Networks. International Conference on Web Search and Data Mining, 2010. total 10 pages.
M. Kimura, et. al, Learning Information Diffusion Model in a Social Network for Predicting Influence of Nodes. Intelligent Data Analysis, 2011. pp. 633-652.
K. Saito, et. al, Prediction of Information Diffusion Probabilities for Independent Cascade Model. Knowledge-Based Intelligent Information and Engineering Systems, 2008. total 9 pages.
R. S. Burt. Structural Holes versus Network Closure as Social Capital. Social Capital: Theory and Research, 2001. total 30 pages.
L. Page, S. Brin, R. Motwani, and T. Winograd. The PageRank Citation Ranking: Bringing Order to the Web. Technical Report SIDL-WP-1999-0120, Stanford University, Jan. 29, 1998. total 17 pages.

* cited by examiner

METHOD AND DEVICE FOR PREDICTING INFORMATION PROPAGATION IN SOCIAL NETWORK

CROSS-REFERENCE TO RELATED APPLICATIONS

This application is a continuation of International Application No. PCT/CN2015/079877, filed on May 27, 2015, which claims priorities to Chinese Patent Application No. 201510131640.0, filed on Mar. 24, 2015 and Chinese Patent Application No. 201410478217.3, filed on Sep. 18, 2014. The disclosures of the aforementioned applications are hereby incorporated by reference in their entireties.

TECHNICAL FIELD

Embodiments of the present application relate to the field of information processing, and in particular, to a method and device for predicting information propagation in a social network.

BACKGROUND

By using an information propagation model, positive or negative impact of different factors on information propagation is computed according to propagation records, including paths, ranges, and/or speeds, of different information in a network, and then a prediction is made on a propagation path of new information or existing information. The most important factor in information propagation is influences of different network nodes on an information propagation process. Information propagation models are widely applied in different types of networks, such as social networks, communications networks, computer networks, and the Internet. In a social network, one of the most important applications of the information propagation model is to find the most valuable user (network node), for example, a user whose influence on other users is the greatest, a user whose influence range is the widest, or a user who propagates a message the fastest.

Current information propagation models are generally created for modeling influences of only a few users. Taking message forwarding in a social network as an example, an influence rank of a user is generated by using a few characteristics of the user, such as quantity of followers (fans) and quantity of times of which a message is forwarded, and edges (social relationships) between users are weighted to represent an influence of the user on another user. However, for the information propagation model, weights of edges between all users need to be given or learned in advance. For a social network with massive user data, it is highly complex to learn weights of edges between all users, which leads to low computational efficiency of the information propagation model.

SUMMARY

Embodiments of the present application provide a method for predicting information propagation in a social network, where the method has high computational efficiency.

According to a first aspect, a method for predicting information propagation in a social network is provided, where the method includes:

acquiring target information to be predicted, and acquiring influences of K clusters, where the target information is posted or forwarded by a first user, the K clusters are used to indicate K categories of characteristic attributes of users, the influences of the K clusters include information propagation success rates of the K clusters, and K is a positive integer;

determining a role probability distribution of the first user, and determining a second user who has not propagated the target information, where the role probability distribution of the first user is used to indicate probabilities that the first user belongs separately to the K clusters; and determining, according to the influences of the K clusters and the role probability distribution of the first user, a probability that the second user forwards the target information from the first user.

With reference to the first aspect, in a first possible implementation manner of the first aspect, the target information is posted or forwarded by the first user at an initial moment, and the method further includes outputting an account of the second user who meets a preset condition, where the preset condition is that the probability of forwarding the target information is greater than a preset probability threshold.

With reference to the first aspect or the first possible implementation manner of the first aspect, in a second possible implementation manner of the first aspect, before the acquiring target information to be predicted, and acquiring influences of K clusters, the method further includes:

acquiring an information propagation record, a user relationship database, and a user characteristics database from the social network, where the information propagation record includes a historical propagation record of existing information, the user relationship database includes a follow relationship between existing users, and the user characteristics database includes characteristic attributes of the existing users;

obtaining the K clusters and characteristic attributes of the K clusters according to the user characteristics database by using a soft clustering algorithm, where the K clusters are K categories that are determined according to the characteristic attributes of the existing users; and obtaining the influences of the K clusters according to the information propagation record and the user relationship database by using a learning method.

With reference to the second possible implementation manner of the first aspect, in a third possible implementation manner of the first aspect, the determining a role probability distribution of the first user includes:

acquiring a characteristic attribute of the first user; and determining the role probability distribution of the first user according to the characteristic attribute of the first user and the characteristic attributes of the K clusters.

With reference to the third possible implementation manner of the first aspect, in a fourth possible implementation manner of the first aspect, the characteristic attribute of the first user is indicated by AT, and the characteristic attributes of the K clusters are indicated by $KT_j$, where j=1, 2, . . . , K; and the following step is performed:

determining that the role probability distribution of the first user is K values corresponding to the K clusters, where the K values are $$\frac{\|AT - KT_j\|}{\sum_{j=1}^{K} \|AT - KT_j\|} \times 100\%$$

respectively.

With reference to the second possible implementation manner of the first aspect, in a fifth possible implementation manner of the first aspect, before the acquiring target information to be predicted, and acquiring influences of K clusters, the method further includes:

determining role probability distributions of the existing users according to the user characteristics database and the characteristic attributes of the K clusters, where the role probability distributions of the existing users are used to indicate probabilities that the existing users belong separately to the K clusters.

With reference to the fifth possible implementation manner of the first aspect, in a sixth possible implementation manner of the first aspect, the first user belongs to the existing users, and the determining a role probability distribution of the first user includes:

acquiring the role probability distribution of the first user from the role probability distributions of the existing users.

With reference to the fifth possible implementation manner of the first aspect, in a seventh possible implementation manner of the first aspect, the first user does not belong to the existing users, and the determining a role probability distribution of the first user includes:

acquiring a characteristic attribute of the first user;

acquiring characteristic attributes of N third users from the user characteristics database according to the characteristic attribute of the first user, where the N third users belong to the existing users, distances between the characteristic attributes of the N third users and the characteristic attribute of the first user are less than a preset distance threshold, and N is a positive integer;

acquiring role probability distributions of the N third users from the role probability distributions of the existing users; and determining the role probability distribution of the first user according to the role probability distributions of the N third users.

With reference to the seventh possible implementation manner of the first aspect, in an eighth possible implementation manner of the first aspect, the determining the role probability distribution of the first user according to the role probability distributions of the N third users includes:

determining that the role probability distribution of the first user is an arithmetic mean of the role probability distributions of the N third users.

With reference to any possible implementation manner of the second possible implementation manner of the first aspect to the eighth possible implementation manner of the first aspect, in a ninth possible implementation manner of the first aspect, the learning method is a machine learning method or a statistical learning method.

With reference to the first aspect or any one of the foregoing possible implementation manners of the first aspect, in a tenth possible implementation manner of the first aspect, the determining, according to the influences of the K clusters and the role probability distribution of the first user, a probability that the second user forwards the target information from the first user includes:

calculating, according to the influences of the K clusters and the role probability distribution of the first user by using a statistical method, an expected value of a propagation probability that the second user forwards the target information; and using the expected value of the propagation probability as the probability that the second user forwards the target information from the first user.

With reference to the first aspect or any one of the foregoing possible implementation manners of the first aspect, in an eleventh possible implementation manner of the first aspect, the influences of the K clusters further include information propagation time delay rates of the K clusters, and the method further includes:

determining, according to the influences of the K clusters and the role probability distribution of the first user, a moment at which the second user forwards the target information from the first user.

With reference to the first aspect or any one of the foregoing possible implementation manners of the first aspect, in a twelfth possible implementation manner of the first aspect, the second user is a user who is among followers of the first user and who has not propagated the target information.

With reference to the twelfth possible implementation manner of the first aspect, in a thirteenth possible implementation manner of the first aspect, the determining a second user who has not propagated the target information includes:

determining the followers of the first user according to the user relationship database; and determining the second user from the followers of the first user, where the second user has not propagated the target information.

According to a second aspect, a device for predicting information propagation in a social network is provided, where the device includes:

an acquiring unit, configured to: acquire target information to be predicted, and acquire influences of K clusters, where the target information is posted or forwarded by a first user, the K clusters are used to indicate K categories of characteristic attributes of users, the influences of the K clusters include information propagation success rates of the K clusters, and K is a positive integer; and a determining unit, configured to: determine a role probability distribution of the first user, and determine a second user who has not propagated the target information acquired by the acquiring unit, where the role probability distribution of the first user is used to indicate probabilities that the first user belongs separately to the K clusters, where the determining unit is further configured to determine, according to the influences of the K clusters and the role probability distribution of the first user, a probability that the second user forwards the target information from the first user, where the influences of the K clusters are acquired by the acquiring unit.

With reference to the second aspect, in a first possible implementation manner of the second aspect, the target information is posted or forwarded by the first user at an initial moment, and the device further includes:

an output unit, configured to output an account of the second user who meets a preset condition, where the preset condition is that the probability of forwarding the target information is greater than a preset probability threshold.

With reference to the second aspect or the first possible implementation manner of the second aspect, in a second possible implementation manner of the second aspect, the acquiring unit is further configured to acquire an information propagation record, a user relationship database, and a user characteristics database from the social network, where the information propagation record includes a historical propagation record of existing information, the user relationship database includes a follow relationship between existing users, and the user characteristics database includes characteristic attributes of the existing users;

the determining unit is further configured to obtain the K clusters and characteristic attributes of the K clusters according to the user characteristics database by using a soft clustering algorithm, where the K clusters are K categories that are determined according to the characteristic attributes of the existing users; and the determining unit is further configured to obtain the influences of the K clusters according to the information propagation record and the user relationship database by using a learning method.

With reference to the second possible implementation manner of the second aspect, in a third possible implementation manner of the second aspect, the determining unit is specifically configured to:

acquire a characteristic attribute of the first user; and determine the role probability distribution of the first user according to the characteristic attribute of the first user and the characteristic attributes of the K clusters.

With reference to the third possible implementation manner of the second aspect, in a fourth possible implementation manner of the second aspect, the characteristic attribute of the first user is indicated by AT, and the characteristic attributes of the K clusters are indicated by $KT_j$, where j=1, 2, . . . , K; and the determining unit is specifically configured to:

determine that the role probability distribution of the first user is K values corresponding to the K clusters, where the K values are $$\frac{\|AT - KT_j\|}{\sum_{j=1}^{K} \|AT - KT_j\|} \times 100\%$$

respectively.

With reference to the second possible implementation manner of the second aspect, in a fifth possible implementation manner of the second aspect, the determining unit is further configured to:

determine role probability distributions of the existing users according to the user characteristics database and the characteristic attributes of the K clusters, where the role probability distributions of the existing users are used to indicate probabilities that the existing users belong separately to the K clusters.

With reference to the fifth possible implementation manner of the second aspect, in a sixth possible implementation manner of the second aspect, the first user belongs to the existing users, and the determining unit is specifically configured to:

acquire the role probability distribution of the first user from the role probability distributions of the existing users.

With reference to the fifth possible implementation manner of the second aspect, in a seventh possible implementation manner of the second aspect, the first user does not belong to the existing users, and the determining unit is specifically configured to:

acquire a characteristic attribute of the first user;

acquire characteristic attributes of N third users from the user characteristics database according to the characteristic attribute of the first user, where the N third users belong to the existing users, distances between the characteristic attributes of the N third users and the characteristic attribute of the first user are less than a preset distance threshold, and N is a positive integer;

acquire role probability distributions of the N third users from the role probability distributions of the existing users; and determine the role probability distribution of the first user according to the role probability distributions of the N third users.

With reference to the seventh possible implementation manner of the second aspect, in an eighth possible implementation manner of the second aspect, the determining unit is specifically configured to:

determine that the role probability distribution of the first user is an arithmetic mean of the role probability distributions of the N third users.

With reference to any possible implementation manner of the second possible implementation manner of the second aspect to the eighth possible implementation manner of the second aspect, in a ninth possible implementation manner of the second aspect, the learning method is a machine learning method or a statistical learning method.

With reference to the second aspect or any one of the foregoing possible implementation manners of the second aspect, in a tenth possible implementation manner of the second aspect, the determining unit is specifically configured to:

calculate, according to the influences of the K clusters and the role probability distribution of the first user by using a statistical method, an expected value of a propagation probability that the second user forwards the target information; and use the expected value of the propagation probability as the probability that the second user forwards the target information from the first user.

With reference to the second aspect or any one of the foregoing possible implementation manners of the second aspect, in an eleventh possible implementation manner of the second aspect, the influences of the K clusters further include information propagation time delay rates of the K clusters, and the determining unit is further configured to:

determine, according to the influences of the K clusters and the role probability distribution of the first user, a moment at which the second user forwards the target information from the first user.

With reference to the second aspect or any one of the foregoing possible implementation manners of the second aspect, in a twelfth possible implementation manner of the second aspect, the second user is a user who is among followers of the first user and who has not propagated the target information.

With reference to the twelfth possible implementation manner of the second aspect, in a thirteenth possible implementation manner of the second aspect, the determining unit is specifically configured to:

determine the followers of the first user according to the user relationship database; and determine the second user from the followers of the first user, where the second user has not propagated the target information.

In the embodiments of the present application, propagation of target information in a social network can be predicted by using influences of K clusters. The prediction method has a small amount of computation and high computational efficiency.

BRIEF DESCRIPTION OF DRAWINGS

The following briefly introduces the accompanying drawings used in describing the embodiments of the present application.

DESCRIPTION OF EMBODIMENTS

Figure 1:
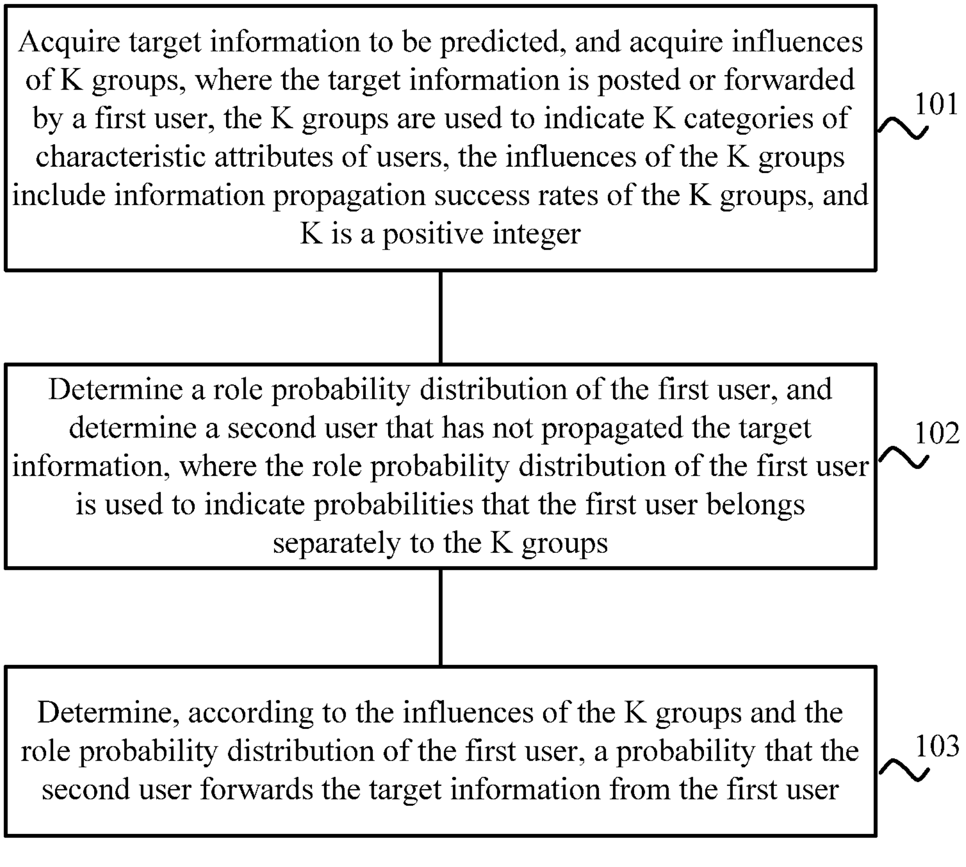
FIG. 1 is a flowchart of a method for predicting information propagation in a social network according to an embodiment of the present application.

A social network may be understood as an online community. Normally, it is a dedicated website or other application that enables users to communicate with each other by posting information, comments, messages, images, etc. There are a huge number of users in a social network. For example, there may be hundreds and thousands of users, or may be millions and tens of millions of users or even more.

For example, social networks that are commonly used include Weibo or MicroBlog, WeChat, Yixin, MiTalk, Facebook, Twitter, and LinkedIn.

User Relationship Database

In a social network, relationships between users may be recorded in a "user relationship database". The "user relationship database" includes a follow relationship between existing users. Specifically, a relationship may be established between users by means of "following". For example, if a user A follows a user B, the user A is a follower of the user B, or the user A may also be referred to as a "fan" of the user B.

It should be noted that in some social networks such as Weibo, a user A is a follower of a user B, but the user B is not necessarily a follower of the user A. In some social networks such as WeChat, a user A is a follower of a user B, the user B is also certainly a follower of the user A, and the user A and the user B may also be referred to as "friends."

Optionally, in a social network, a relationship between two users may be indicated by using a triplet or 2-tuple.

The first item of the triplet may be an ID of a first user, the second item may be an ID of a second user, and the third item may indicate whether the first user follows the second user, where, for example, if the third item is 1, it indicates that the first user follows the second user, and if the third item is 0, it indicates that the first user does not follow the second user. For example, in a social network such as Weibo, a relationship between every two users may be indicated by using two triplets: <A, B, 1> and <B, A, 0>, where <A, B, 1> indicates that a user A follows a user B, and <B, A, 0> indicates that the user B does not follow the user A. Then, it may be understood that if it is assumed that there are M users in a social network, a "user relationship database" in a social network such as Weibo may be indicated by using $M\times(M-1)$ triplets. Alternatively, the "user relationship database" may include only triplets of which the third item is 1, and then a quantity of stored triplets may be far less than $M\times(M-1)$. Alternatively, the "user relationship database" may include only 2-tuples, where the 2-tuple may be understood as the first two items of the foregoing triplet of which the third item is 1, and then a quantity of stored 2-tuples may be far less than $M\times(M-1)$. In this way, storage spaces can be saved.

Alternatively, the first item of the triplet may be an ID of a first user, the second item may be an ID of a second user, and the third item may indicate whether the first user and the second user are friends, where if the third item is 1, it indicates that the first user and the second user are friends, and if the third item is 0, it indicates that the first user and the second user are not friends. For example, in a social network such as WeChat, a triplet <A, B, 1> is used to indicate that a user A and a user B are friends. That is, the user A is a follower of the user B, and the user B is also a follower of the user A. Then, it may be understood that if it is assumed that there are M users in a social network, a "user relationship database" in a social network such as WeChat may be indicated by using $M!/2\times(M-2)!$ triplets. Alternatively, the "user relationship database" may include only triplets of which the third item is 1, and then a quantity of stored triplets may be far less than $M!/2\times(M-2)!$. Alternatively, the "user relationship database" may include only 2-tuples, where the 2-tuple may be understood as the first two items of the foregoing triplet of which the third item is 1, and then a quantity of stored 2-tuples may be far less than $M!/2\times(M-2)!$. In this way, storage spaces can be saved.

Optionally, in a social network, a relationship between two users may be indicated by using a four-tuple.

The first item of the four-tuple may be an ID of a first user, the second item may be an ID of a second user, the third item may indicate whether the first user follows the second user, and the fourth item may indicate whether the second user follows the first user, where the third item and the fourth item may be indicated by using 0 or 1. For example, <A, B, 1, 0> indicates that a user A follows a user B, but the user B does not follow the user A, and <A, B, 1, 1> indicates that a user A follows a user B, and the user B also follows the user A. Then, it may be understood that if it is assumed that there are M users in a social network, a "user relationship database" in the social network may be indicated by using $M!/2\times(M-2)!$ four-tuples. Alternatively, the "user relationship database" may include only four-tuples of which at least one of the third item and the fourth item is 1, and then a quantity of stored four-tuples may be far less than $M!/2\times(M-2)!$.

It should be noted that a representation form of the "user relationship database" is not limited in the embodiments of the present application.

Information Propagation Record

In a social network, propagation of existing information may be recorded by using an "information propagation record". The "information propagation record" includes a historical propagation record of the existing information. The historical propagation record may include a historical propagation path and a historical propagation time. Specifically, the historical propagation record may record that a user posts (post or tweet) a piece of information at a moment, or that a user forwards (forward or repost or retweet) a piece of information from another user at a moment.

Optionally, in a social network, an "information propagation record" may be represented by a four-tuple.

The first item of the four-tuple may be an ID of a first user, the second item may be an ID of a second user, the third item may be a moment, and the fourth item may be an information ID. For example, <A, B, t1, m1> indicates that a user A forwards information, of which an information ID is m1, from a user B at a moment t1.

Alternatively, the first item of the four-tuple may be an ID of a first user, the second item may be null or may be a negative number, the third item may be a moment, and the fourth item may be an information ID. For example, <A, t1, m1> or <A, −100, t1, m1> indicates that a user A posts information, of which an information ID is m1, at a moment t1.

It should be noted that a representation form of the "information propagation record" is not limited in the embodiments of the present application.

It should be noted that a form of the information is not limited in the embodiments of the present application. For example, the information may be in a form of a text, or the information may be in a form of an audio file or a video file, or the information may be in a form of a webpage link.

User Characteristics Database

In a social network, characteristic attributes of a user may be recorded by using a "user characteristics database". The "user characteristics database" includes characteristic attributes of existing users, where the characteristic attributes may include personal attributes, network attributes, and behavior attributes. The personal attributes may include basic attributes of a user, such as age, gender, birthplace, and occupation. The network attributes may include significance, centrality, structural hole characteristic, and the like of a user in a social network. For example, the significance may be represented by a PageRank value, the centrality may be represented by an outdegree and an indegree, and the structural hole characteristic may be represented by a network constraint index. The behavior attributes may include an activity level of a behavior of a user in a social network, where the behaviors of the user in the social network may include posting, forwarding, commenting, and the like.

Understandably, the network attributes are related to the "user relationship database". Specifically, a network attribute of a user may be obtained by means of computation according to the "user relationship database". In a social network such as Weibo, the centrality may be represented by an outdegree and an indegree, and the outdegree is generally not equal to the indegree. In a social network such as WeChat, the centrality may be represented by either an outdegree or an indegree, and the outdegree is equal to the indegree; in this case, both the outdegree and the indegree are equal to a quantity of friends, that is, the centrality may also be represented by the quantity of friends.

Understandably, the behavior attributes are related to the "information propagation record". Specifically, a behavior attribute of a user may be obtained by means of computation according to the "information propagation record". The activity level is related to a quantity of behaviors of a user within a unit of time, and the activity level may be a value, where a larger value indicates a higher activity level. For example, the activity level may be indicated by using five integers from 1 to 5, where 5 indicates an extremely high activity level, 4 indicates a relatively high activity level, 3 indicates an average activity level, 2 indicates a low activity level, and 1 indicates an extremely low activity level. Alternatively, for example, the activity level may be indicated by using a percentage from 0% to 100%, where, for example, 80% indicates a relatively high activity level, 50% indicates an average activity level, 20% indicates a low activity level, and so on.

Understandably, characteristic attributes of each user in the "user characteristics database" may be represented by an H-dimensional characteristic vector. Assuming there are M users, the user characteristics database may include M H-dimensional characteristic vectors. Alternatively, the user characteristics database may also be represented by an M×H matrix, where M and H are positive integers. For example, assuming H=9, and each of the components of an H-dimensional (H=9) characteristic vector of a user represents age, gender, birthplace, occupation, significance, centrality, posting activity level, forwarding activity level, and commenting activity level, respectively. If characteristic attributes of a user A is represented by a characteristic vector AT={20, F, BJ, Doc, 0.65, 50, 4, 2, 4}, it indicates that user A's age is 20, gender is female, birthplace is Beijing, occupation is doctor, significance is 0.65, quantity of friends is 50, posting activity level is 4, forwarding activity level is 2, and commenting activity level is 4.

It should be noted that the value of H in the "user characteristics database" may be larger or smaller. That is, the characteristic vector of the user may have more or fewer dimensions, which is not limited in the present application.

FIG. 1 is a flowchart of a method for predicting information propagation in a social network, according to an embodiment of the present application. The method includes the following steps:

101. Acquire target information, the propagation of which is to be predicted, and acquire influences of K clusters, where the target information is posted or forwarded by a first user, the K clusters correspond to K categories of characteristic attributes of users, the influences of the K clusters include information propagation success rates of the K clusters, and K is a positive integer.

102. Determine a role probability distribution of the first user, and determine a second user who has not propagated the target information, where the role probability distribution of the first user is used to indicate probabilities that the first user belongs to each of the K clusters.

103. Determine, according to the influences of the K clusters and the role probability distribution of the first user, a probability that the second user forwards the target information from the first user.

In this embodiment of the present application, propagation of target information in a social network can be predicted by using influences of K clusters. The prediction method requires a small amount of computation and has high computational efficiency.

Optionally, in this embodiment of the present application, the target information in step 101, of which the propagation is to be predicted, may be posted or forwarded by the first user at an initial moment, and may be indicated in a form of a four-tuple. For example, the initial moment may be marked as a first moment. Then, <ID of the first user, first moment, ID of the target information> represents that the first user posts the target information at the first moment. For another example, <ID of the first user, ID of source user, first moment, ID of target information> represents that the first user forwards the target information from the source user at the first moment.

Optionally, in this embodiment of the present application, in step 102, the second user may be a user to be predicted.

For example, if it is expected to learn about a case in which a user A propagates the target information, the second user may be the user A. For another example, if it is expected to learn about a case in which a user whose age is 30 propagates the target information, the second user may be a user whose characteristic attribute of age is 30 and who has not propagated the target information.

Alternatively, in this embodiment of the present application, in step 102, the second user may be a user who is among followers of the first user and who has not propagated the target information. Then, the followers of the first user may be determined according to the user relationship database, and the second user is determined from the followers of the first user, where the second user has not propagated the target information.

It may be understood that a quantity of second users is not limited in this embodiment of the present application. For example, there may be one or more second users.

In this embodiment of the present application, the influences of the K clusters may be obtained by means of training. Then, in step 101, the influences of the K clusters can be acquired according to a result of the training. It may be understood that before step 101, the method may further include: acquiring an information propagation record, a user relationship database, and a user characteristics database from the social network, where the information propagation record includes a historical propagation record of existing information, the user relationship database includes a follow relationship between existing users, and the user characteristics database includes characteristic attributes of the existing users; obtaining the K clusters and characteristic attributes of the K clusters according to the user characteristics database by using a soft clustering algorithm; and obtaining the influences of the K clusters according to the information propagation record and the user relationship database by using a learning method, where the K clusters are K categories that are determined according to the characteristic attributes of the existing users, and K is a positive integer.

The information propagation record, the user relationship database, and the user characteristics database are the same as described above. To avoid repetition, details are not described herein again.

The soft clustering algorithm may also be referred to as a fuzzy clustering algorithm. For example, the soft clustering algorithm may be a Fuzzy C-means algorithm (FCMA or FCM), a probabilistic mixture model, and the like. The K clusters may also be referred to as K categories or K roles.

Assuming there are M existing users, that is, the user characteristics database includes characteristic attributes of M existing users, the obtaining the K clusters according to the user characteristics database by using a soft clustering algorithm may be clustering the M existing users into the K clusters according to a similarity between the characteristic attributes of the M existing users. Generally, K is far less than M. For example, it may be that $K=10^{-3}\times M$, or even that $K=10^{-8}\times M$, which is not limited in the present application.

It can be learned that because a quantity K of the clusters is far less than a quantity M of the users, the method in this embodiment of the present application has a small amount of computation. Therefore, the method has high computational efficiency.

A characteristic attribute of a cluster in the K clusters may be a representative characteristic attribute of the cluster. For example, the representative characteristic attribute of the cluster may be a characteristic attribute of a central point of the cluster, or the representative characteristic attribute of the cluster may be a characteristic attribute of a user who is closest to a central point in the cluster, where the central point of the cluster may be defined as a mean of characteristic attributes of all users belonging to the cluster.

Specifically, the characteristic attributes of the K clusters may be indicated by using K H-dimensional characteristic vectors, or it may be understood that the characteristic attributes of the K clusters may be indicated by using a K×H matrix.

In this way, the determining a role probability distribution of the first user in step 102 may include: acquiring a characteristic vector of the first user; and determining the role probability distribution of the first user according to the characteristic vector of the first user and the characteristic vectors of the K clusters.

Specifically, the role probability distribution of the first user may be determined according to distances between the characteristic vector of the first user and the characteristic vectors of the K clusters.

For example, the characteristic vector of the first user is indicated by AT, and the characteristic vectors of the K clusters are indicated by $KT_j$, where j=1, 2, . . . , K, and the following step is performed:

determining that the role probability distribution of the first user, which includes K values corresponding to the K clusters, where the K values are $$\frac{\|AT-KT_j\|}{\sum_{j=1}^{K}\|AT-KT_j\|}\times 100\%$$

j=1, 2, . . . , K, respectively, where $\|\cdot\|$ indicates a modulus or a norm.

It may be understood that the role probability distribution of the first user may be indicated in a form of a K-dimensional vector consisting of the foregoing K values.

Optionally, in another embodiment, before step 101, the method may further include: determining role probability distributions of the existing users according to the user characteristics database and the characteristic vectors of the K clusters, where the role probability distributions of the existing users are used to indicate probabilities that the existing users belong to each of the K clusters.

The role probability distributions of the existing users may be determined according to the characteristic attributes of the existing users and the characteristic attributes of the K clusters. The characteristic attributes of the K clusters may be obtained according to the method in the foregoing embodiment. To avoid repetition, details are not described herein again. For example, if it is assumed that characteristic attributes of a user B in the existing users forms a characteristic vector BT, and the characteristic attributes of the K clusters form K characteristic vectors which are $KT_j$, respectively, where j=1, 2, . . . , K, a role probability distribution of the user B may include K values which are $$\frac{\|BT-KT_j\|}{\sum_{j=1}^{K}\|BT-KT_j\|}\times 100\%$$

respectively, where j=1, 2, . . . , K, and $\|\cdot\|$ indicates a modulus or a norm. It should be noted that $\|\cdot\|$ may be an infinite norm $\|\cdot\|_\infty$, or may be a 2-norm $\|\cdot\|_2$, or may be a norm in another form, which is not limited in the present application.

In this way, if the first user belongs to the existing users, the determining a role probability distribution of the first user in step 102 may include: acquiring the role probability distribution of the first user from the role probability distributions of the existing users.

In this way, if the first user does not belong to the existing users, the determining a role probability distribution of the first user in step 102 may include: acquiring characteristic attributes of the first user; acquiring characteristic attributes of N third users from the user characteristics database according to the characteristic attributes of the first user, where the N third users belong to the existing users, distances between the characteristic attributes of the N third users and the characteristic attributes of the first user are less than a preset distance threshold, and N is a positive integer; acquiring role probability distributions of the N third users from the role probability distributions of the existing users; and determining the role probability distribution of the first user according to the role probability distributions of the N third users.

It may be understood that the N third users are users whose characteristic attributes are similar to the characteristic attributes of the first user. Optionally, the determining the role probability distribution of the first user according to the role probability distributions of the N third users may include: determining that the role probability distribution of the first user is an arithmetic mean of the role probability distributions of the N third users.

It should be noted that in this embodiment of the present application, if the first user does not belong to the existing users, it may be understood that the first user is a new user. In this way, this embodiment of the present application can resolve a cold start problem.

From a different perspective, even though there are not enough existing users in a training process, a prediction process can still be implemented subsequently. That is, this embodiment of the present application can resolve a problem of sparse data.

Optionally, in this embodiment of the present application, obtaining the influences of the K clusters by means of training, that is, the obtaining the influences of the K clusters according to the information propagation record and the user relationship database by using a learning method, may be: calculating, according to the information propagation record, the user relationship database and with reference to the role probability distributions of the existing users, an influence of an existing user belonging to each cluster on a forwarding behavior of a follower of the existing user, and further learning influences of the K clusters in an information propagation process.

Optionally, the learning method may be a machine learning method or a statistical learning method, which is not limited in the present application.

Optionally, in this embodiment of the present application, the influences of the K clusters may include the information propagation success rates of the K clusters. The information propagation success rate may be indicated by using an influence factor. That is, the influences of the K clusters may include influence factors of the K clusters, where the influence factors of the K clusters may be understood as success rates of the K clusters in an information propagation process. Then, the influences of the K clusters may be indicated by using a K-dimensional vector.

Optionally, in this embodiment of the present application, the influences of the K clusters may include the information propagation success rates of the K clusters and information propagation time delay rates of the K clusters. Optionally, the influence includes an influence factor and a time delay. That is, the influences of the K clusters may include influence factors of the K clusters and time delays of the K clusters, where the influence factors of the K clusters may be understood as success rates of the K clusters in an information propagation process, and the time delays of the K clusters may be understood as probabilities that the K clusters delay relative to a moment in an information propagation process. Then, the influences of the K clusters may be indicated by using a K×2 matrix.

Optionally, the influence factor and the time delay may be values between 0 and 1, where a larger value indicates a greater influence. Optionally, the influence factor and the time delay may be integer values between 1 and 5, where a larger integer value indicates a greater influence. The present application has no limitation thereto.

Alternatively and optionally, the determining the influences of the K clusters by means of training may also be: setting a likelihood function for information propagation record data, and performing optimization on the likelihood function according to the information propagation record, the user relationship database, and the user characteristics database, so as to determine the influences of the K clusters.

For example, the likelihood function may be defined as the following formula (1):

$$\log L = \sum_{i=1}^{I}\sum_{t=1}^{T}\sum_{v\in A_{it}} \log P(v\in A_{it}) + \sum_{i=1}^{T}\sum_{v\notin D_{iT}} \log P(v\notin D_{iT}) + \sum_{u\in V}\sum_{h=1}^{H} \log P(x_{uh}) + \sum_{u\in V}\sum_{k=1}^{K} \log P(\theta_{uk}|\alpha) + \sum_{k=1}^{K}\{\log P(\rho_k|\beta) + \log P(\lambda_k|\gamma)\} + \sum_{k=1}^{K}\sum_{h=1}^{H} \log P(\mu_{kh}, \delta_{kh}|\tau) \tag{1}$$

where I represents a total amount of information, T represents a maximum moment, H represents dimensions of a characteristic vector of a user, K represents a quantity of clusters, and V represents a set of all users.

$A_{it}$ represents a user set that has propagated information i at a moment t, and $D_{iT}$ represents a user set that has propagated information i at a moment T; $X_{uh}$ represents a value of an $h^{th}$ component of a characteristic vector of a user u; $\theta_{uk}$ represents a probability that the user u belongs to a $k^{th}$ cluster in an information propagation process; $\rho_k$ and $\lambda_k$ represent an influence of the $k^{th}$ cluster, where $\rho_k$ represents an influence factor (success rate) of the $k^{th}$ cluster, and represents a time delay of the $k^{th}$ cluster; $\mu_{kh}$ represents a mean (mean) of an $h^{th}$ components of characteristic vectors of all users belonging to the $k^{th}$ cluster, and $\delta_{kh}$ represents precision (precision) of the $h^{th}$ components of the characteristic vectors of all the users belonging to the $k^{th}$ cluster.

Then, it may be understood that log $P(v\in A_{it})$ represents a probability that a user participates, at a moment t, in propagation of information i, log $P(v\notin D_{iT})$ represents a probability that a user does not participate, at a moment T, in propagation of information i, log $P(x_{uh})$ represents a probability of the $h^{th}$ component of the characteristic vector of the user u, and $$P(v\in A_{it}) = \sum_{z^t_{i^*v}} P(z_{i^*v}) - \prod_{u\in B(v)\cap D_{it-1}} P(z^t_{iuv}=0) = \prod_{u\in B(v)\cap D_{it-1}} (\varphi^t_{iuv} + \varepsilon^t_{iuv}) - \prod_{u\in B(v)\cap D_{it-1}} \varepsilon^t_{iuv}, \tag{2}$$

$$P(v\notin D_{iT}) = \prod_{u\in B(v)\cap D_{iT}} \sum_k (1-\rho_k)\theta_{uk}, \text{ and} \tag{3}$$

-continued $$P(x_{uh}) = \sum_k \left( \sqrt{\frac{\delta_{kh}}{2\pi}} \exp\left\{ -\frac{\delta_{kh}(x_{uh} - \mu_{kh})^2}{2} \right\} \theta_{uk} \right), \tag{4}$$

where $\varphi^t_{iuv} = P(z^t_{iuv} = 1) = \sum_k \rho_k \lambda_k (1 - \lambda_k)^{t - t_{iu} - 1} \theta_{uk}$, and $$\begin{aligned} \varepsilon^t_{iuv} &= P(z^t_{inv} = 0) \\ &= \sum_k \theta_{uk} \left( 1 - \rho_k \left[ \sum_{t' = t_{iu}+1}^{t} \lambda_k (1 - \lambda_k)^{t' - t_{iu} - 1} \right] \right) \\ &= \sum_k \theta_{uk} \left( \rho_k (1 - \lambda_k)^{t' - t_{iu} - 1} + 1 - \rho_k \right). \end{aligned}$$

Further, for performing optimization on the likelihood function, $\theta_{uk}$, $\rho_k$, $\lambda_k$, $\mu_{kh}$, and $\delta_{kh}$ may be determined by using an existing generative model parameter learning method. The generative model parameter learning method may be a Gibbs sampling method or a variational method.

It should be noted that in this embodiment of the present application, the likelihood function may also be in another form, which is not limited in the present application.

Optionally, in step 103, a probability that the second user forwards the target information from the first user may be determined according to the influences of the K clusters and the role probability distribution of the first user by using a Bayesian theory.

Optionally, in step 103, an expected value of a propagation probability that the second user forwards the target information may be calculated according to the influences of the K clusters and the role probability distribution of the first user by using a statistical method, and the expected value of the propagation probability is used as the probability that the second user forwards the target information from the first user.

Optionally, if the influences of the K clusters further include the information propagation time delay rates of the K clusters, that is, if the influences of the K clusters include the information propagation success rates of the K clusters and the information propagation time delay rates of the K clusters, the method in FIG. 1 may further include: determining, according to the influences of the K clusters and the role probability distribution of the first user, a moment at which the second user forwards the target information from the first user.

Specifically, the moment at which the second user forwards the target information from the first user may be determined according to the influences of the K clusters and the role probability distribution of the first user by using the Bayesian theory.

Optionally, an expected value of a propagation moment at which the second user forwards the target information may be calculated according to the influences of the K clusters and the role probability distribution of the first user by using a statistical method, and the expected value of the propagation moment is used as the moment at which the second user forwards the target information from the first user.

It should be noted that a step in which the moment at which the second user forwards the target information from the first user is determined may be performed before or after step 103, or may be performed simultaneously with step 103, which is not limited in the present application.

It should be noted that in this embodiment of the present application, the step in which the probability that the second user forwards the target information from the first user is determined, and the step in which the moment at which the second user forwards the target information from the first user is determined may be performed separately and independently, or may be performed alternately in a mutual coupling manner.

For example, for a latent variable k of a characteristic attribute h of the user u, a prior probability of a sample of the latent variable k may be indicated by:

$$\begin{aligned} P(r_{uh} | k_{\neg uh,x}) &= \frac{P(x, k)}{P(x_{\neg uh}, k_{\neg uh}} \\ &= \frac{n^{\neg uh}_{uk_{uh}} + \alpha\Gamma\left(\tau_2 + \frac{n_{k_{uh}h}}{2}\right)}{\sum_k (n^{\neg uh}_{uk} + \alpha)\Gamma\left(\tau_2 + \frac{n^{\neg uh}_{k_{uh}h}}{2}\right)} \times \\ &\quad \frac{\sqrt{\left(\tau_1 + n^{\neg uh}_{k_{uh}h}\right)}\, \eta\left(n^{\neg uh}_{k_{uh}h}, \overline{x}^{\neg uh}_{k_{uh}h}, s^{\neg uh}_{k_{uh}}\right)}{\sqrt{\left(\tau_1 + n_{k_{uh}h}\right)}\, \eta\left(n_{k_{uh}h}, \overline{x}_{k_{uh}h}, s_{k_{uh}}\right)} \end{aligned} \tag{5}$$

where $r_{uh}=K_{uh}$, a Stirling's formula approximated Γ function is used in this embodiment of the present application, and a function η(·) is defined as:

$$\eta(n_{k_{uh}h}, \overline{x}_{k_{uh}h}, s_{k_{uh}}) = \left[ \tau_3 + \frac{1}{2}\left( n_{k_{uh}h} s_{k_{uh}h} + \frac{\tau_1 n_{k_{uh}h}(\overline{x}_{k_{uh}h} - \tau_0)^2}{\tau_1 + n_{k_{uh}h}} \right) \right]^{\left(\tau_2 + \frac{n_{k_{uh}h}}{2}\right)} \tag{6}$$

where $\tau_0$, $\tau_1$, $\tau_2$, and $\tau_3$ are Normal-Gamma prior parameters.

For latent variables (t, k, z), the following formula holds:

$$\begin{aligned} &P(k_{iuv}, \Delta t_{iuv}, z_{iuv} | k_{\neg iuv}, \Delta t_{\neg iuv}, z_{\neg iuv}, y) = \\ &\frac{P(k, \Delta t, z, y)}{P(| k_{\neg iuv}, \Delta t_{\neg iuv}, z_{iuv}, y)} = \frac{n^{\neg iuv}_{uk_{iuv}} + \alpha}{\sum_k (n^{\neg iuv}_{uk} + \alpha)} \times \frac{n^{\neg iuv}_{z_{iuv}k_{iuv}} + \beta_1^{z_{iuv}} \beta_0^{1 - z_{iuv}}}{n^{\neg iuv}_{1k_{iuv}} + \beta_1 + n^{\neg iuv}_{0k_{iuv}} + \beta_0} \times \\ &\frac{(n^{\neg iuv}_{k_{iuv}} + \gamma_1) \prod_{t=0}^{\Delta t - 2} (s^{\neg iuv}_{k_{iuv}} - n^{\neg iuv}_{k_{iuv}} + \gamma_0 + t)}{\prod_{t=0}^{\Delta t - 1} (\gamma_1 + s^{\neg iuv}_{k_{iuv}} + \gamma_0 + t)} \times \Phi \end{aligned} \tag{7}$$

Model parameters may be estimated according to a sample result. Specifically, the model parameters may be updated to:

$$\theta_{uk} = P\left(\tilde{k} = k | k, \Delta t, z, y\right) = \frac{n_{uk} + \alpha}{\sum_k (n_{uk} + \alpha)},$$

$$\lambda_k = P\left(\Delta \tilde{t} = 1 | \tilde{k} = k, k, \Delta t, z, y\right) = \frac{n_k + \gamma_1}{\gamma_1 + s_k + \gamma_0}, \text{ and}$$

$$\rho_k = P\left(\tilde{z} = 1 | \tilde{k} = k, k, \Delta t, z, y\right) = \frac{n_{1k} + \beta_1}{n_{1k} + \beta_1 + n_{ok} + \beta_0}.$$

In this way, the probability of forwarding the target information and the moment at which the target information is forwarded may be estimated as follows:

$$\mu_{kh} \approx E(\mu_{kh}) = \frac{\tau_0\tau_1 + n_{kh}\overline{x}_{kh}}{\tau_1 + n_{kh}}, \text{ and } \delta_{kh} \approx E(\delta_{kh}) = \frac{2\tau_2 + n_{kh}}{2\tau_3 + n_{kh}s_{kh} + \frac{\tau_1 n_{kh}(\overline{x}_{kh} - \tau_0)^2}{\tau_1 + n_{kh}}},$$ where $E(\cdot)$ indicates an expectation.

It may be understood that $\delta_{kh}$ herein is a time interval, and the moment at which the second user forwards the target information is the initial moment at which the first user posts or forwards the target information plus the time interval $\delta_{kh}$.

Optionally, the target information is posted or forwarded by the first user at the initial moment, and after the method shown in FIG. 1, that is, after step 103, the method include: outputting an account of the second user who meets a preset condition, where the preset condition is that the probability of forwarding the target information is greater than a preset probability threshold.

Optionally, if the influences of the K clusters further include the information propagation time delay rates of the K clusters, the moment at which the second user forwards the target information from the first user may further be determined. Then, correspondingly, the preset condition may further include that duration between the moment at which the target information is forwarded and the initial moment is less than a preset duration threshold.

It should be noted that a form of the account is not limited in this embodiment of the present application. For example, the account may be an identifier (ID), or may be a name.

It should be noted that values of the preset probability threshold and the preset duration threshold are not limited in this embodiment of the present application. For example, the preset probability threshold may be 0.3, and the preset duration threshold may be 12 hours.

It may be understood that in the method shown in FIG. 1, for the target information to be predicted, prediction is performed on propagating, by a follower of the first user, the target information. Further, prediction may also be performed on propagating, by a follower of a follower of the first user, the target information, and so on, which is shown in FIG. 2.

Figure 2:
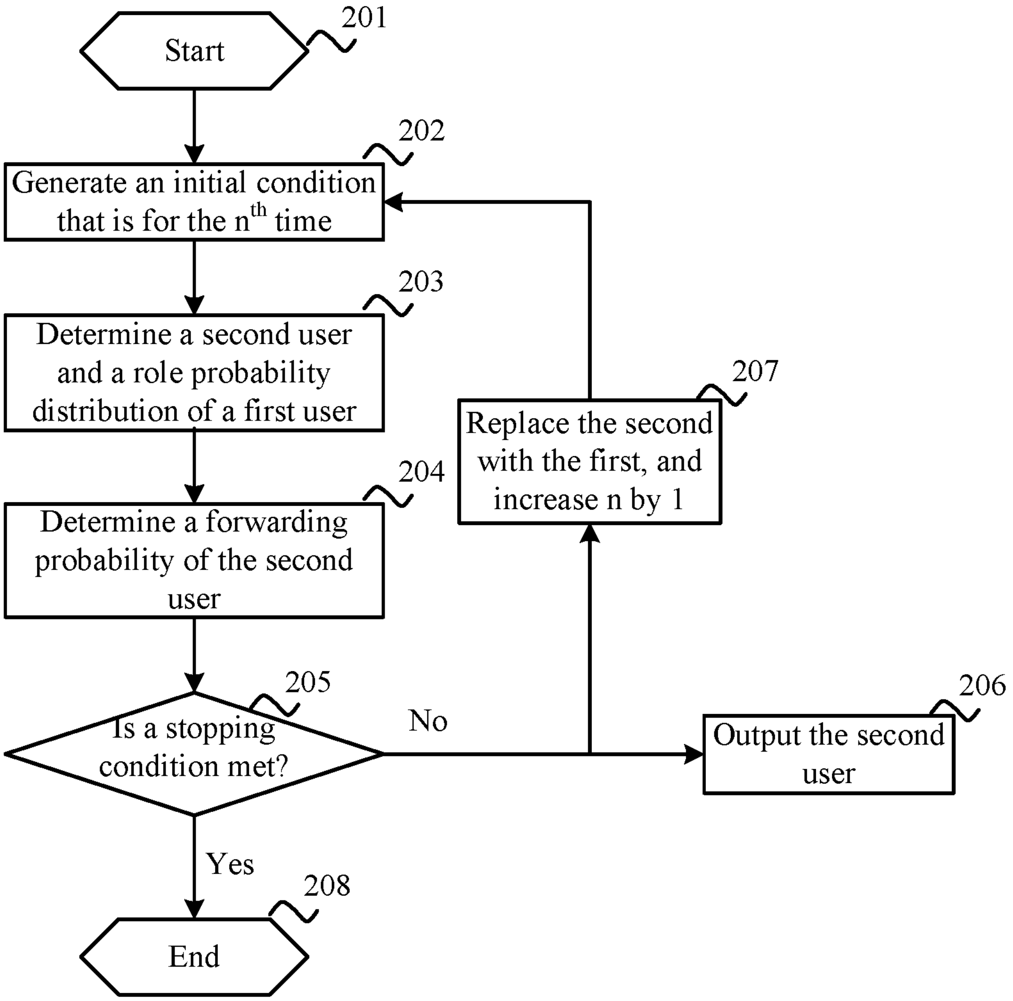
FIG. 2 is a flowchart of a method for predicting information propagation in a social network according to another embodiment of the present application.

Specifically, in FIG. 2, it is assumed that a user X posts information m at a moment $t_0$, which may be indicated by using a four-tuple <X, $t_0$, m>. A method shown in FIG. 2 is predication performed on propagating the information m within a preset duration threshold starting from $t_0$. The method shown in FIG. 2 includes the following steps:

201. Start, where specifically, it is determined that a user X posts information m at a moment $t_0$, and the following is assumed: n=1.

202. Generate an initial condition that is for the $n^{th}$ time.

When n=1, the initial condition is that a first user posts/forwards the information m at a first moment, which may be indicated by using a four-tuple <X, $t_0$, m>.

Specifically, after step 201, the first user is the user X, and the first moment is $t_0$.

203. Determine a role probability distribution of a first user, and determine a second user who is among followers of the first user and has not propagated the information m.

Specifically, for step 203, reference may be made to step 102 in the foregoing embodiment. To avoid repetition, details are not described herein again.

204. Determine, according to influences of K clusters and the role probability distribution of the first user, a probability that the second user forwards the information m from the first user; or determine, according to influences of K clusters and the role probability distribution of the first user, a probability that the second user forwards the information m from the first user, and a second moment at which the second user forwards the information m from the first user.

Specifically, for step 204, reference may be made to step 103 in the foregoing embodiment. To avoid repetition, details are not described herein again.

205. Determine whether a preset stopping condition is met, and if the preset stopping condition is met, perform step 208; if the preset stopping condition is not met, perform step 206 and step 207.

Optionally, the stopping condition may include that: the probability that the second user forwards the information m from the first user is less than a preset probability threshold, or the stopping condition may include that: duration from the moment $t_0$ to the second moment is greater than a duration threshold, and the probability that the second user forwards the information m from the first user is less than a preset probability threshold.

In the following embodiment, it is assumed that the stopping condition is that duration from the moment $t_0$ to the second moment is greater than the duration threshold, and the probability that the second user forwards the information m from the first user is less than the preset probability threshold.

For example, the duration threshold may be equal to 24 hours, and the probability threshold may be equal to 0.2, which is not limited in the present application.

It may be understood that at least one second user is determined in step 204. If it is assumed that M1 second users are determined in step 204, in step 205, whether each of the M1 second users meets the preset stopping condition needs to be determined. In addition, if it is determined that each of the M1 second users meets the preset stopping condition, it is considered that a result of the determining in step 205 is that the preset stopping condition is met; or if the determining is performed on each of the M1 second users, as long as one of the M1 second users does not meet the preset stopping condition, it is considered that a result of the determining in step 205 is that the preset stopping condition is not met. Further, it may be understood that step 206 and step 207 are performed for a second user who is among the M1 second users and who does not meet the preset stopping condition.

As an example, it is assumed that among followers of the user X, none of a probability that user Y1 forwards m, a probability that user Y2 forwards m, a second moment at which user Y1 forwards m, and a second moment at which user Y2 forwards m meets the preset stopping condition; the probability that user Y1 forwards m from user X is P1, the second moment at which user Y1 forwards m from X is t1, the probability that user Y2 forwards m from user X is P2, and the second moment at which user Y2 forwards m from X is t2.

206. Output the second user.

It may be understood that in step 206, a second user who is determined in step 205 and does not meet the preset stopping condition is output.

Optionally, an account of the second user may be output. Alternatively, optionally, a probability that the second user forwards m may further be output, or a probability that the second user forwards m and a second moment at which the second user forwards m may further be output.

As an example, if it is assumed that among the followers of the user X, none of the probability that Y1 forwards m, the probability that Y2 forwards m, the second moment at which Y1 forwards m, and the second moment at which Y2 forwards m meets the preset stopping condition, Y1 and Y2 may be output in step 206. Alternatively, two vectors, namely, (Y1, P1, t1) and (Y2, P2, t2), may be output in step 206. It may be understood that each of the two vectors output in step 206 includes three components, where the first component indicates an account, the second component indicates a forwarding probability, and the third component indicates a forwarding moment.

207. Replace the second with the first, and increase n by 1.

Specifically, the second user who is determined in step 205 and does not meet the preset stopping condition is replaced with the first user, and the second moment at which the second user performs forwarding is replaced with the first moment.

Then, correspondingly, step 202 performed after step 207 may be: the first user forwards information m at the first moment.

As an example, if it is assumed that among the followers of the user X, none of the probability that Y1 forwards m, the probability that Y2 forwards m, the second moment at which Y1 forwards m, and the second moment at which Y2 forwards m meets the preset stopping condition, when n=1, the initial condition generated in step 202 may be indicated by using a four-tuple <Y1, X, t1, m> and a four-tuple <Y2, X, t2, m>.

208. End.

Specifically, when it is determined in step 205 that all the second users meet the preset stopping condition, the prediction process ends.

In this way, a user of which a probability of propagating the information m within the preset duration threshold is greater than the preset probability threshold can be acquired in step 206.

It should be noted that the stopping condition is not limited in this embodiment of the present application. For example, the stopping condition may be that a quantity of iterations is greater than or equal to a preset iteration threshold, that is, a value of n is greater than or equal to the preset iteration threshold. For example, the stopping condition may be that a quantity of output users is greater than a preset quantity threshold, that is, a quantity of second users output in step 206 is greater than the preset quantity threshold.

It should be noted that values of the preset iteration threshold and the preset quantity threshold are not limited in this embodiment of the present application. For example, a value of the preset iteration threshold may be 10. For example, a value of the preset quantity threshold may be 1000.

In this way, in this embodiment of the present application, propagation of information in a social network can be predicted by using influences of K clusters, and the prediction method has a small amount of computation and high computational efficiency.

In this way, an enterprise can make various business decisions efficiently by using this embodiment provided in the present application. For example, if the enterprise expects to achieve a particular advertising promotion effect, for example, the enterprise expects that a piece of information can be propagated to at least one thousand people within one day, the enterprise may set a stopping condition according to the expectation, and perform prediction on information propagation by using the method shown in FIG. 2, where it is assumed that the user X is Zhang San. If the prediction indicates that the expectation of the enterprise can be met, the enterprise may post information directed at Zhang San. For example, the posted information may be product introduction information of a new product.

In addition, it may be understood that according to the method in the present application, a decision on risk management and the like can also be made in a timely manner according to a prediction result of information propagation.

Figure 3:
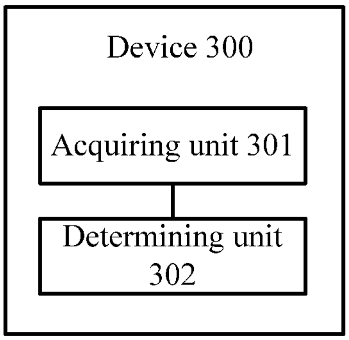
FIG. 3 is a functional block diagram of a device, capable of predicting information propagation in a social network, according to an embodiment of the present application.

FIG. 3 is a block diagram of a device for predicting information propagation in a social network according to an embodiment of the present application. A device 300 shown in FIG. 3 includes an acquiring unit 301 and a determining unit 302.

The acquiring unit 301 is configured to: acquire target information to be predicted, and acquire influences of K clusters, where the target information is posted or forwarded by a first user, the K clusters are used to indicate K categories of characteristic attributes of users, the influences of the K clusters include information propagation success rates of the K clusters, and K is a positive integer.

The determining unit 302 is configured to: determine a role probability distribution of the first user, and determine a second user who has not propagated the target information acquired by the acquiring unit 301, where the role probability distribution of the first user is used to indicate probabilities that the first user belongs separately to the K clusters.

The determining unit 302 is further configured to determine, according to the influences of the K clusters and the role probability distribution of the first user, a probability that the second user forwards the target information from the first user, where the influences of the K clusters are acquired by the acquiring unit 301.

In this embodiment of the present application, propagation of target information in a social network can be predicted by using influences of K clusters. The prediction method has a small amount of computation and high computational efficiency.

Optionally, in an embodiment, the target information is posted or forwarded by the first user at an initial moment, and the device further includes an output unit, configured to output an account of the second user who meets a preset condition, where the preset condition is that the probability of forwarding the target information is greater than a preset probability threshold.

Optionally, in another embodiment, the acquiring unit 301 is further configured to acquire an information propagation record, a user relationship database, and a user characteristics database from the social network, where the information propagation record includes a historical propagation record of existing information, the user relationship database includes a follow relationship between existing users, and the user characteristics database includes characteristic attributes of the existing users;

the determining unit 302 is further configured to obtain the K clusters and characteristic attributes of the K clusters according to the user characteristics database by using a soft clustering algorithm, where the K clusters are K categories that are determined according to the characteristic attributes of the existing users; and the determining unit 302 is further configured to obtain the influences of the K clusters according to the information propagation record and the user relationship database by using a learning method.

Optionally, in another embodiment, the determining unit 302 is specifically configured to:

acquire a characteristic attribute of the first user; and determine the role probability distribution of the first user according to the characteristic attribute of the first user and the characteristic attributes of the K clusters.

Optionally, in another embodiment, the characteristic attribute of the first user is indicated by AT, and the characteristic attributes of the K clusters are indicated by $KT_j$, where j=1, 2, . . . , K; and the determining unit 302 is specifically configured to:

determine that the role probability distribution of the first user is K values corresponding to the K clusters, where the K values are $$\frac{\|AT - KT_j\|}{\sum_{j=1}^{K} \|AT - KT_j\|} \times 100\%$$

respectively.

Optionally, in another embodiment, the determining unit 302 is further configured to:

determine role probability distributions of the existing users according to the user characteristics database and the characteristic attributes of the K clusters, where the role probability distributions of the existing users are used to indicate probabilities that the existing users belong separately to the K clusters.

Optionally, in another embodiment, the first user belongs to the existing users, and the determining unit 302 is specifically configured to:

acquire the role probability distribution of the first user from the role probability distributions of the existing users.

Optionally, in another embodiment, the first user does not belong to the existing users, and the determining unit 302 is specifically configured to:

acquire a characteristic attribute of the first user;

acquire characteristic attributes of N third users from the user characteristics database according to the characteristic attribute of the first user, where the N third users belong to the existing users, distances between the characteristic attributes of the N third users and the characteristic attribute of the first user are less than a preset distance threshold, and N is a positive integer;

acquire role probability distributions of the N third users from the role probability distributions of the existing users; and determine the role probability distribution of the first user according to the role probability distributions of the N third users.

Optionally, in another embodiment, the determining unit 302 is specifically configured to determine that the role probability distribution of the first user is an arithmetic mean of the role probability distributions of the N third users.

Optionally, in another embodiment, the learning method is a machine learning method or a statistical learning method.

Optionally, in another embodiment, the determining unit 302 is specifically configured to:

calculate, according to the influences of the K clusters and the role probability distribution of the first user by using a statistical method, an expected value of a propagation probability that the second user forwards the target information; and use the expected value of the propagation probability as the probability that the second user forwards the target information from the first user.

Optionally, in another embodiment, the influences of the K clusters further include information propagation time delay rates of the K clusters, and the determining unit 302 is further configured to determine, according to the influences of the K clusters and the role probability distribution of the first user, a moment at which the second user forwards the target information from the first user.

Correspondingly, the foregoing preset condition may further include that duration between the moment at which the target information is forwarded and the initial moment is less than a preset duration threshold.

Optionally, in another embodiment, the second user is a user who is among followers of the first user and who has not propagated the target information.

Optionally, in another embodiment, the determining unit 302 is specifically configured to: determine the followers of the first user according to the user relationship database, and determine the second user from the followers of the first user, where the second user has not propagated the target information.

Optionally, in this embodiment of the present application, the device 300 shown in FIG. 3 may be a server for a social network.

The device 300 shown in FIG. 3 can implement processes in the methods shown in FIG. 1 and FIG. 2. To avoid repetition, details are not described herein again.

Figure 4:
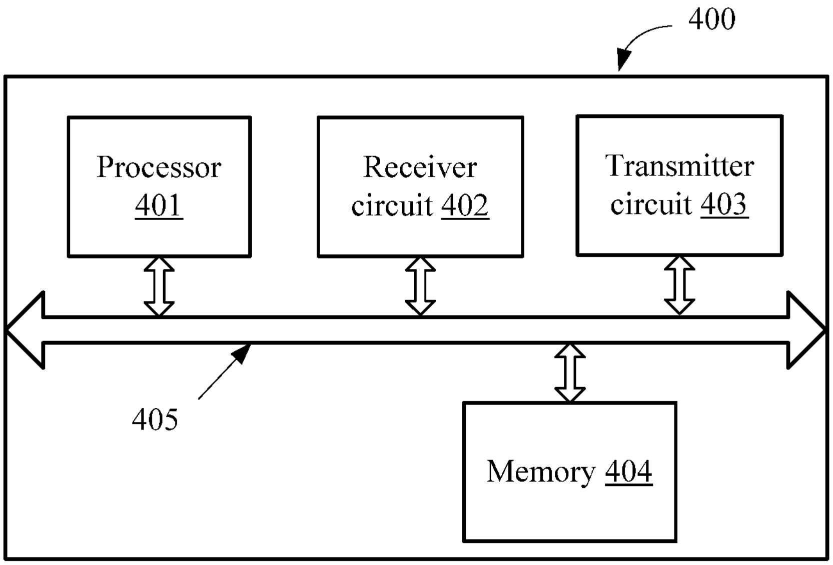
FIG. 4 is a block diagram of a device, capable of predicting information propagation in a social network, according to another embodiment of the present application.

FIG. 4 is a block diagram of a device for predicting information propagation in a social network according to another embodiment of the present application. A device 400 shown in FIG. 4 includes a processor 401, a receiver circuit 402, a transmitter circuit 403, and a memory 404, i.e. the device 400 may be a general-purpose computer or a specially constructed computing device.

The receiver circuit 402 is configured to: acquire target information to be predicted, and acquire influences of K clusters, where the target information is posted or forwarded by a first user, the K clusters are used to indicate K categories of characteristic attributes of users, the influences of the K clusters include information propagation success rates of the K clusters, and K is a positive integer.

The processor 401 is configured to: determine a role probability distribution of the first user, and determine a second user who has not propagated the target information, where the role probability distribution of the first user is used to indicate probabilities that the first user belongs separately to the K clusters.

The processor 401 is further configured to determine, according to the acquired influences of the K clusters and the acquired role probability distribution of the first user, a probability that the second user forwards the target information from the first user.

In this embodiment of the present application, propagation of target information in a social network can be predicted by using influences of K clusters. The prediction method has a small amount of computation and high computational efficiency.

The components in the device 400 are coupled together by using a bus system 405, where the bus system 405 further includes a power bus, a control bus, and a status signal bus in addition to a data bus. However, for clear description, in FIG. 4, all kinds of buses are uniformly marked as the bus system 405.

The methods disclosed in the foregoing embodiments of the present application may be applied in the processor 401, or may be implemented by the processor 401. The processor 401 may be an integrated circuit chip and has a signal processing capability. In an implementation process, the steps in the foregoing methods may be completed by using an integrated logic circuit in a form of hardware in the processor 401 or instructions in a form software in the processor 401. The processor 401 may be a general purpose processor, a digital signal processor (DSP), an application-specific integrated circuit (ASIC), a field programmable gate array (FPGA), or another programmable logic device, a discrete gate or a transistor logic device, or a discrete hardware component. The processor 401 may implement or execute methods, steps and logical block diagrams disclosed in the embodiments of the present application. The general purpose processor may be a microprocessor or the processor may be any conventional processor and the like. The steps of the methods disclosed in the embodiments of the present application may be executed by a hardware decoding processor directly, or by a combination of a hardware module and a software module in a decoding processor. The software module may be located in a mature storage medium in the field, such as a random access memory, a flash memory, a read-only memory, a programmable read-only memory, an electrically-erasable programmable memory, or a register. The storage medium is located in the memory 404, and the processor 401 reads information in the memory 404 and completes the steps in the foregoing methods in combination with hardware of the processor.

It may be understood that the memory 404 in this embodiment of the present application may be a volatile memory or non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Description is provided by using examples other than by means of limitation, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DR RAM). It should be noted that the memory 404 in the system and the methods described in the specification is intended to include, but is not limited to, these and any other suitable types of memories.

It may be understood that these embodiments described in the specification may be implemented by means of hardware, software, firmware, middleware, microcode, or a combination thereof. For hardware implementation, a processing unit may be implemented in one or more application-specific integrated circuits (ASIC), digital signal processors (DSP), digital signal processing devices (DSPD), programmable logic devices (PLD), field programmable gate arrays (FPGA), general purpose processors, controllers, microcontrollers, microprocessors, other electronic units for performing the functions described in the present application, or a combination thereof.

When the embodiments are implemented in software, firmware, middleware, microcode, program code, or a code segment, the software, firmware, middleware, microcode, program code, or code segment may be stored in, for example, a machine-readable medium in a storage component. A code segment may represent any combination of a process, a function, a subprogram, a program, a routine, a subroutine, a module, a software group, a class, an instruction, a data structure, or a program statement. A code segment may be coupled to another code segment or a hardware circuit by means of transmission and/or reception of information, data, an independent variable, a parameter, or memory content. The information, independent variable, parameter, data, and the like may be transferred, forwarded, or sent in any suitable manner, including memory sharing, message transferring, token transferring, network transmission, and the like.

For software implementation, the technology described in the specification may be implemented by using a module (such as a process and a function) that performs the functions described in the specification. Software code may be stored in a memory unit and executed by a processor. The memory unit may be implemented in a processor or outside a processor, and in the latter case, the memory unit may be coupled to the processor in a communication mode by using various means known in the art.

Optionally, in an embodiment, the target information is posted or forwarded by the first user at an initial moment, and the transmitter circuit 403 of the device 400 is configured to output an account of the second user who meets a preset condition, where the preset condition is that the probability of forwarding the target information is greater than a preset probability threshold.

Optionally, in another embodiment, the receiver circuit 402 is further configured to acquire an information propagation record, a user relationship database, and a user characteristics database from the social network, where the information propagation record includes a historical propagation record of existing information, the user relationship database includes a follow relationship between existing users, and the user characteristics database includes characteristic attributes of the existing users;

the processor 401 is further configured to obtain the K clusters and characteristic attributes of the K clusters according to the user characteristics database by using a soft clustering algorithm, where the K clusters are K categories that are determined according to the characteristic attributes of the existing users; and the processor 401 is further configured to obtain the influences of the K clusters according to the information propagation record and the user relationship database by using a learning method.

It may be understood that in this embodiment of the present application, the memory 404 may be configured to store the information propagation record, the user relationship database, and the user characteristics database. The memory 404 is further configured to store the characteristic attributes of the K clusters and the influences of the K clusters.

Optionally, in another embodiment, the processor 401 is specifically configured to:

acquire a characteristic attribute of the first user; and determine the role probability distribution of the first user according to the characteristic attribute of the first user and the characteristic attributes of the K clusters.

Optionally, in another embodiment, the characteristic attribute of the first user is indicated by AT, and the characteristic attributes of the K clusters are indicated by $KT_j$, where $j=1, 2, \ldots, K$; and the process unit 401 is specifically configured to:

determine that the role probability distribution of the first user is K values corresponding to the K clusters, where the K values are $$\frac{\|AT - KT_j\|}{\sum_{j=1}^{K} \|AT - KT_j\|} \times 100\%$$

respectively.

Optionally, in another embodiment, the processor 401 is further configured to:

determine role probability distributions of the existing users according to the user characteristics database and the characteristic attributes of the K clusters, where the role probability distributions of the existing users are used to indicate probabilities that the existing users belong separately to the K clusters.

Optionally, in another embodiment, the first user belongs to the existing users, and the processor 401 is specifically configured to acquire the role probability distribution of the first user from the role probability distributions of the existing users.

Optionally, in another embodiment, the first user does not belong to the existing users, and the processor 401 is specifically configured to:

acquire a characteristic attribute of the first user;

acquire characteristic attributes of N third users from the user characteristics database according to the characteristic attribute of the first user, where the N third users belong to the existing users, distances between the characteristic attributes of the N third users and the characteristic attribute of the first user are less than a preset distance threshold, and N is a positive integer;

acquire role probability distributions of the N third users from the role probability distributions of the existing users; and determine the role probability distribution of the first user according to the role probability distributions of the N third users.

Optionally, in another embodiment, the processor 401 is specifically configured to determine that the role probability distribution of the first user is an arithmetic mean of the role probability distributions of the N third users.

Optionally, in another embodiment, the learning method is a machine learning method or a statistical learning method.

Optionally, in another embodiment, the processor 401 is specifically configured to:

calculate, according to the influences of the K clusters and the role probability distribution of the first user by using a statistical method, an expected value of a propagation probability that the second user forwards the target information; and use the expected value of the propagation probability as the probability that the second user forwards the target information from the first user.

Optionally, in another embodiment, the influences of the K clusters further include information propagation time delay rates of the K clusters, and the processor 401 is further configured to determine, according to the influences of the K clusters and the role probability distribution of the first user, a moment at which the second user forwards the target information from the first user.

Correspondingly, the foregoing preset condition may further include that duration between the moment at which the target information is forwarded and the initial moment is less than a preset duration threshold.

Optionally, in another embodiment, the second user is a user who is among followers of the first user and who has not propagated the target information.

Optionally, in another embodiment, the processor 401 is specifically configured to: determine the followers of the first user according to the user relationship database; and determine the second user from the followers of the first user, where the second user has not propagated the target information.

The device 400 shown in FIG. 4 can implement processes in the methods shown in FIG. 1 and FIG. 2. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory ROM, a RAM, a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for predicting information propagation in a social network, wherein each user of the social network is registered at the social network with a set of characteristic attributes, users of the social network are grouped into K clusters each represented by a different characteristic vector, and K is a positive integer, wherein the method is performed by a computing device, and the method comprises:

acquiring information of an object that is posted or forwarded by a first user of the social network;

determining influences of the K clusters, wherein the influences of the K clusters correspond to propagation success rates of the object in the K clusters;

determining a role probability distribution of the first user according to the set of characteristic attributes of the first user and characteristic vectors of the K clusters, wherein the role probability distribution of the first user indicates probabilities that the first user belongs to each of the K clusters;

identifying a second user who has not propagated the object; and determining, according to the influences of the K clusters and the role probability distribution of the first user, a probability that the second user forwards the object from the first user;

wherein the set of characteristic attributes of the first user form a characteristic vector AT, and the characteristic vectors of the K clusters are indicated by $KT_j$, respectively, wherein j=1, 2, . . . , K; and wherein the role probability distribution of the first user is determined by:

$$\frac{\|AT - KT_j\|}{\sum_{j=1}^{K} \|AT - KT_j\|} \times 100\%$$

respectively.

2. The method according to claim 1, wherein the object is posted or forwarded by the first user at an initial moment, and wherein the method further comprises:

outputting an account of the second user who meets a preset condition, wherein the preset condition is that the probability of forwarding the object by the second user is greater than a preset probability threshold.

3. The method according to claim 1, further comprising:

acquiring an information propagation record, a user relationship database, and a user characteristics database of the social network, wherein the information propagation record comprises a historical propagation record of existing information, the user relationship database comprises a follow relationship between existing users, and the user characteristics database comprises characteristic attributes of the existing users; and obtaining the K clusters and characteristic vectors of the K clusters according to the user characteristics database by using a soft clustering algorithm, wherein the K clusters and characteristic vectors of the K clusters are determined according to the characteristic attributes of the existing users;

wherein the influences of the K clusters are obtained according to the information propagation record and the user relationship database by using a learning method.

4. The method according to claim 3, further comprising:

determining role probability distributions of the existing users according to the user characteristics database and the characteristic vectors of the K clusters, wherein the role probability distributions of the existing users indicates probabilities that the existing users belong to each of the K clusters.

5. The method according to claim 3, wherein the first user belongs to the existing users of the social network, and wherein determining the role probability distribution of the first user according to the set of characteristic attributes of the first user and the characteristic vectors of the K clusters comprises:

determining role probability distributions of the existing users according to the user characteristics database and the characteristic vectors of the K clusters, wherein the role probability distributions of the existing users indicates probabilities that the existing users belong to each of the K clusters; and acquiring the role probability distribution of the first user from the role probability distributions of the existing users.

6. The method according to claim 3, wherein the first user does not belong to the existing users of the social network, and wherein determining the role probability distribution of the first user according to the set of characteristic attributes of the first user and the characteristic vectors of the K clusters comprises:

acquiring characteristic attributes of the first user;

acquiring characteristic attributes of N third users from the user characteristics database according to the characteristic attributes of the first user, wherein the N third users belong to the existing users, distances between the characteristic attributes of the N third users and the characteristic attributes of the first user are less than a preset distance threshold, and N is a positive integer;

acquiring role probability distributions of the N third users from the role probability distributions of the existing users; and determining the role probability distribution of the first user according to the role probability distributions of the N third users.

7. The method according to claim 6, wherein the determining the role probability distribution of the first user according to the role probability distributions of the N third users comprises:

determining that the role probability distribution of the first user is an arithmetic mean of the role probability distributions of the N third users.

8. The method according to claim 3, wherein the learning method is a machine learning method or a statistical learning method.

9. The method according to claim 1, wherein determining, according to the influences of the K clusters and the role probability distribution of the first user, a probability that the second user forwards the object from the first user comprises:

calculating, according to the influences of the K clusters and the role probability distribution of the first user by using a statistical method, an expected value of a propagation probability that the second user forwards the object;

wherein the expected value of the propagation probability is used as the probability that the second user forwards the object from the first user.

10. The method according to claim 1, wherein the influences of the K clusters further comprise information propagation time delay rates of the K clusters, and the method further comprises:

predicting, according to the influences of the K clusters and the role probability distribution of the first user, a moment at which the second user forwards the target information from the first user.

11. The method according to claim 1, wherein the second user is a user who is among followers of the first user.

12. The method according to claim 11, wherein identifying a second user who has not propagated the object comprises:

determining the followers of the first user according to the user relationship database; and determining the second user among the followers of the first user who have not propagated the target information.

13. A system for predicting information propagation in a social network, wherein each user of the social network is registered at the social network with a set of characteristic attributes, users of the social network are grouped into K clusters each represented by a different characteristic vector, and K is a positive integer, wherein the system comprises:

a memory, configured to store information of the users of the social network; and a processor, configured to:

acquire information of an object that is posted or forwarded by a first user of the social network;

determine influences of the K clusters, wherein the influences of the K clusters correspond to propagation success rates of the object in the K clusters;

determine a role probability distribution of the first user according to the set of characteristic attributes of the first user and characteristic vectors of the K clusters, wherein the role probability distribution of the first user indicates probabilities that the first user belongs to each of the K clusters;

identify a second user who has not propagated the object; and determine, according to the influences of the K clusters and the role probability distribution of the first user, a probability that the second user forwards the object from the first user;

wherein the set of characteristic attribute of the first user form a characteristic vector AT, and the characteristic vectors of the K clusters are indicated by $KT_j$, respectively, wherein j=1, 2, . . . , K, and wherein the role probability distribution of the first user is determined by $$\frac{\|AT - KT_j\|}{\sum_{j=1}^{K} \|AT - KT_j\|} \times 100\%$$

respectively.

14. The system according to claim 13, further comprising:

an output device, configured to output an account of the second user who meets a preset condition, wherein the preset condition is that the probability of forwarding the object by the second user is greater than a preset probability threshold.

15. The system according to claim 13, wherein the processor is further configured to:

acquire an information propagation record, a user relationship database, and a user characteristics database of the social network, wherein the information propagation record comprises a historical propagation record of existing information, the user relationship database comprises a follow relationship between existing users, and the user characteristics database comprises characteristic attributes of the existing users; and obtain the K clusters and characteristic vectors of the K clusters according to the user characteristics database by using a soft clustering algorithm, wherein the K clusters and characteristic vectors of the K clusters are determined according to the characteristic attributes of the existing users;

wherein the influences of the K clusters are obtained according to the information propagation record and the user relationship database by using a learning method.

16. The system according to claim 15, wherein the processor is further configured to:

determine role probability distributions of the existing users according to the user characteristics database and the characteristic attributes of the K clusters, wherein the role probability distributions of the existing users are used to indicate probabilities that the existing users belong separately to the K clusters.

17. A computer program product comprising a non-transitory computer-readable storage medium storing program codes thereon for use by a computing device to predict information propagation in a social network, wherein each user of the social network is registered at the social network with a set of characteristic attributes, users of the social network are grouped into K clusters each represented by a different characteristic vector, and K is a positive integer, and wherein the program codes comprise instructions for:

acquiring information of an object that is posted or forwarded by a first user of the social network;

determining influences of the K clusters, wherein the influences of the K clusters correspond to propagation success rates of the object in the K clusters;

determining a role probability distribution of the first user according to the set of characteristic attributes of the first user and characteristic vectors of the K clusters, wherein the role probability distribution of the first user indicates probabilities that the first user belongs to each of the K clusters;

identifying a second user who has not propagated the object; and determining, according to the influences of the K clusters and the role probability distribution of the first user, a probability that the second user forwards the object from the first user, wherein the set of characteristic attribute of the first user form a characteristic vector AT, and the characteristic vectors of the K clusters are indicated by $KT_j$, respectively, wherein j=1, 2, . . . , K, and wherein the role probability distribution of the first user is determined by $$\frac{\|AT - KT_j\|}{\sum_{j=1}^{K} \|AT - KT_j\|} \times 100\%$$

respectively.

18. The computer program product according to claim 17, wherein the program codes further comprise instructions for:

acquiring an information propagation record, a user relationship database, and a user characteristics database of the social network, wherein the information propagation record comprises a historical propagation record of existing information, the user relationship database comprises a follow relationship between existing users, and the user characteristics database comprises characteristic attributes of the existing users; and obtaining the K clusters and characteristic vectors of the K clusters according to the user characteristics database by using a soft clustering algorithm, wherein the K clusters and characteristic vectors of the K clusters are determined according to the characteristic attributes of the existing users;

wherein the influences of the K clusters are obtained according to the information propagation record and the user relationship database by using a learning method.

* * * * *